United States Patent
Carter et al.

(10) Patent No.: US 8,839,220 B2
(45) Date of Patent: Sep. 16, 2014

(54) METHOD FOR REMOTELY UPDATING SOFTWARE FOR DEVICES IN A BROADBAND NETWORK

(75) Inventors: Wade E. Carter, Snellville, GA (US); Rickey L. Morris, Dacula, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 531 days.

(21) Appl. No.: 10/914,728

(22) Filed: Aug. 9, 2004

(65) Prior Publication Data

US 2005/0034115 A1 Feb. 10, 2005

Related U.S. Application Data

(60) Provisional application No. 60/493,700, filed on Aug. 8, 2003.

(51) Int. Cl.
*G06F 9/44* (2006.01)
*G06F 9/445* (2006.01)

(52) U.S. Cl.
CPC ... *G06F 8/64* (2013.01); *G06F 8/61* (2013.01)
USPC ........................... 717/168; 717/173; 717/177

(58) Field of Classification Search
None
See application file for complete search history.

(56) References Cited

U.S. PATENT DOCUMENTS

| | | | |
|---|---|---|---|
| 6,751,794 B1 * | 6/2004 | McCaleb et al. | 717/168 |
| 6,859,924 B1 * | 2/2005 | Kroening | 717/173 |
| 7,062,765 B1 * | 6/2006 | Pitzel et al. | 717/177 |
| 7,587,713 B1 * | 9/2009 | Barrett et al. | 717/168 |
| 7,627,868 B2 * | 12/2009 | Addington et al. | 717/177 |
| 2003/0046675 A1 * | 3/2003 | Cheng et al. | 717/173 |
| 2004/0015953 A1 * | 1/2004 | Vincent | 717/173 |
| 2004/0181787 A1 * | 9/2004 | Wickham et al. | 717/168 |
| 2005/0097548 A1 * | 5/2005 | Dillenburg et al. | 717/177 |

FOREIGN PATENT DOCUMENTS

WO    WO 0248897 A1 *  6/2002

OTHER PUBLICATIONS

Moyer et al.Home Network Configuration Management & Service Assurance, IEEE 4th International Workshop on Networked Appliances, Jan. 2002, pp. 77-86, Retrieved on [May 12, 2014] Retrieved from the Internet: URL<http://ieeexplore.ieee.org/stamp/stamp.jsp?tp=&arnumber=980806>.*

(Continued)

*Primary Examiner* — Thuy Dao
*Assistant Examiner* — Cheneca Smith
(74) *Attorney, Agent, or Firm* — Troy A. Van Aacken

(57) ABSTRACT

A method includes a customer premise equipment (CPE) downloading a CPE configuration file over a machine communication network. The CPE checks the configuration file for a software load name. If the software load name is found in the configuration file, the CPE downloads an operating software image specified in the software load name, and the resets and enters an initialized state ready for service. If the load name is not found, the CPE determines if the configuration file includes a vendor table having records specific to a vendor of the CPE. If the vendor table is not found, the CPE enters the initialized state ready for service. If the vendor table is found, the CPE locates a record in the vendor table corresponding to a criteria unique to a subset of CPEs of the vendor of the CPE. If the record is found, the CPE downloads an operating software image specified in the record. If the record is not found, the CPE enters the initialized state ready for service.

14 Claims, 2 Drawing Sheets

(56) References Cited

OTHER PUBLICATIONS

Cheung et al.Automatic Device Configuration and Data Validation through Mobile Communication.IEEE Pacific Rim Conference on Communications, Computers and signal Processing, Aug. 2003, pp. 284-287, Retrieved on [May 12, 2014] Retrieved from the Internet: URL< http://ieeexplore.ieee.org/stamp/stamp.jsp?tp=&arnumber=1235773>.*

* cited by examiner

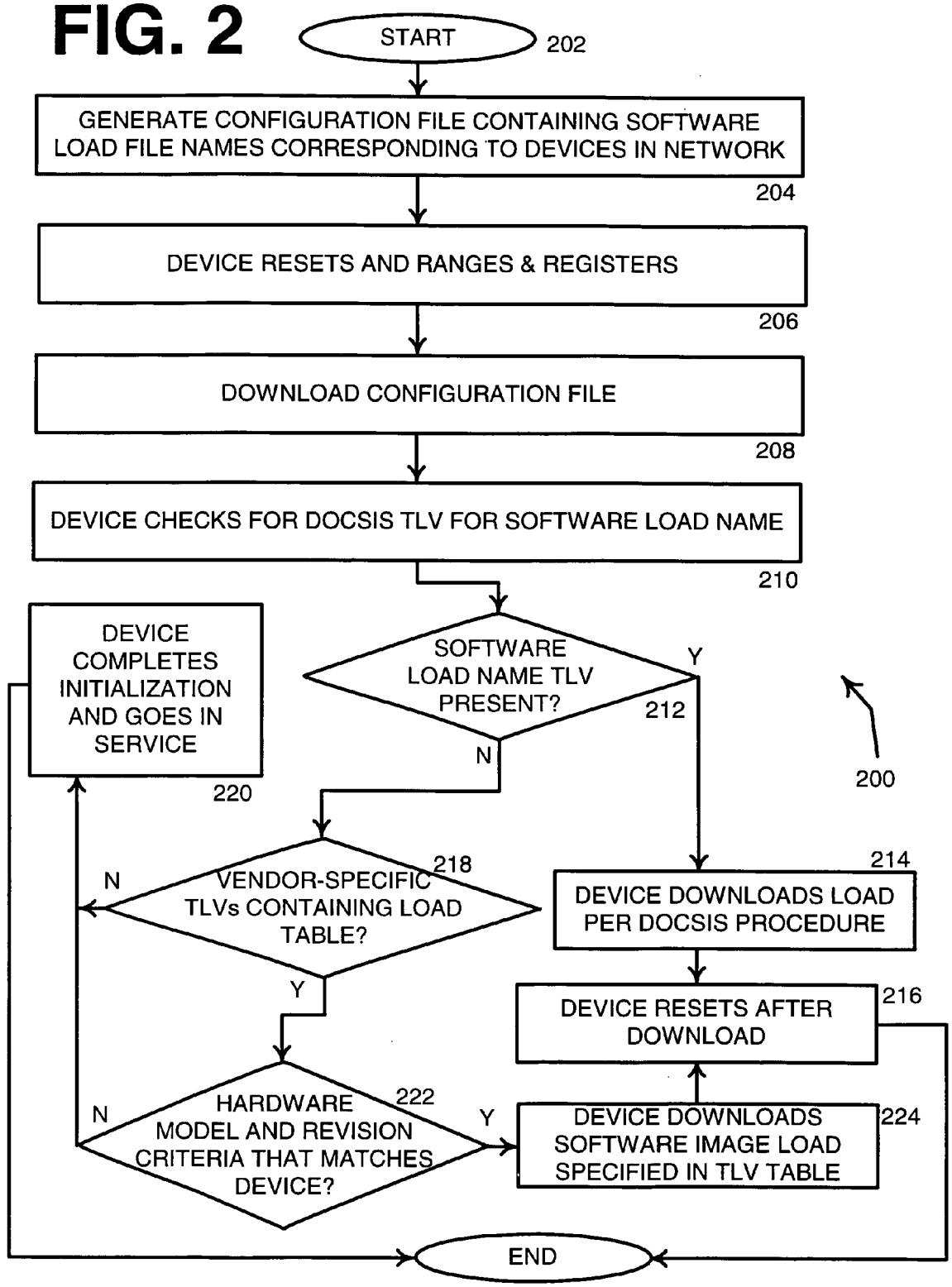

METHOD FOR REMOTELY UPDATING SOFTWARE FOR DEVICES IN A BROADBAND NETWORK

CROSS REFERENCE TO RELATED APPLICATION

This application claims the benefit of priority under 35 U.S.C. 119(e) to the filing date of Carter, et. al., U.S. provisional patent application No. 60/493,700 entitled "Vendor specific method for handling DOCSIS software upgrades for CM/EMTAs in a multi-vendor, multi-product network", which was filed Aug. 8, 2003, and is incorporated herein by reference in its entirety.

FIELD OF THE INVENTION

The present invention relates generally to broadband communication, and more particularly to a method for remotely updating a communication device's software over a network based on information specific to that device.

BACKGROUND

Community antenna television ("CATV") networks have been used for more then four decades to deliver television programming to a large number of subscribers. Increasingly, CATV networks are used by providers to provide data services to subscribers. For example, cable modems used in a broadband cable modem termination system ("CMTS") are capable of transmitting and receiving Internet data using the Data Over Cable Service Interface Specification ("DOCSIS") protocol. DOCSIS provides a standard that allows network devices made by different vendors to communication with one another. In addition, different device models made by the same manufacturer can also communicate with other.

Typically, each communication device is controlled with software that performs various functions. The software typically comprises an operating system, data processor(s), communication interfaces for interpreting data received and preparing data for transmission in a particular format, and other general digital-data-related functions known in the art.

The software is typically loaded onto the device and stored in some type of non-volatile memory known in the art. The particular software file and version number is often referred to as the software 'load', or simply 'load'. A device's load is typically installed at the time of manufacture at the manufacturing plant or location. Currently, many American companies are subcontracting the manufacturing of new network devices to entities that are located overseas, particularly in Asian locations, such as China.

After a batch of a given device is manufactured in China, for example, the batch is packaged for shipment and eventual sale, and loaded onto a seagoing vessel for shipment to the United States. The journey from the manufacturing plant in China to the unloading at a dock in the United States may take between one and two months, due in large part to normal practice of shipping from that region by cargo ship to keep shipping costs low. In addition, after the batch of devices has been unloaded in the United States, they are typically shipped to another warehouse and stored until the device's buyer puts them into use. Customers are typically commercial service providers, such as, for example, cable television operators that also provide data services over their network, but could also include retail customers.

Regardless of who, or what, the buyer is, the ultimate user is typically a residential subscriber that either installs, or has someone install, one of the devices at a time that can be a quite a few months after the devices were made and the software load installed. Thus, in response to fierce competition, equipment makers are constantly improving and upgrading their products. Such change to a product often includes the software load installed into a given device. New software versions for a given device may be needed just to enhance performance, or even to remedy a 'bug' that has been discovered to render a device unworkable.

To provide updates to devices, such as, for example, cable modems, a service provider typically maintains a configuration file corresponding to a manufacturers device. Still using a cable modem for illustration purposes (it will be appreciated that devices other than cable modems may also need updated configuration files from time to time after being placed in service at an end user's location), an identifier is sent upstream to a central location that is operated by the service provider. Typically, the identifier is the media access control ("MAC") identification number (also referred to as the MAC address) a unique identification attribute that is permanently embedded into the MAC layer circuitry at the time of manufacture much like an automobile's unique vehicle identification number is embedded onto the chassis at the time of manufacture. Thus, every device on a network can be uniquely identified.

The MAC identification number comprises a vendor identifier, as well as serial number, model number, as well as other device related information. Accordingly, when a cable modem ranges and registers, the sequence of events also referred to as 'boot up', the modem transmits the MAC address to a first server, typically a DHCP server, of the service provider; the MAC address is used to determine the appropriate configuration file that should be loaded into the modem. The vendor identifier contained in the received MAC address is compared to values in a field of a database loaded on the DHCP server. When a match is found, associated information, including the configuration filename corresponding to the received MAC address is sent to the device having that MAC address. Then, the modem device sends the configuration filename to a second server, a TFTP server, which contains a plurality of configuration files, each corresponding to a different vendor.

As long as every vendor that provides devices that are used on the network manufactures only one device, this system provides acceptable functionality. However, as vendors are diversifying and manufacturing more and more types and versions of devices that are used in a DOCSIS (or similar protocol) network, each of which typically requires a unique software load, the DHCP server cannot distinguish which configuration filename to send back to the requesting device. This is the case even if different configuration files are stored on the TFTP server because the single vendor identifier can only be associated with a single vendor. This could lead to the incorrect software load being loaded onto a given device.

To work around this problem, several measures have been tried. For example, after the devices are unloaded from the vessel and shipped to a warehouse, personnel from the vendor may be dispatched to manually update the software load for every device for which a new software version has been produced. Alternatively, for revisions that are loaded after a device has been placed into service on a network, a network management system ("NMS") periodically polls network devices to determine the current load version, and send a new filename to the device if the current load version is not the latest. Although manually updating the devices before placing them into service provides a feasible process if the number of devices that may be stored in small (typically on the order of a few hundred), as popularity of data-over-cable networks increases, the number of devices that are in the stream of commerce will proportionally increase. Thus, dispatching a vendor's engineer to manually update thousands of devices will become unfeasible. Furthermore, depending on the polling period of an NMS, a user may be without service due to an inoperable device, for a few days, or even weeks, before a new software version file name is sent to the device, which can then use the filename to download the corresponding file from the TFTP server.

Accordingly, there is a need in the art for a method for updating the software load version for a device at the time the device is placed into service, rather than waiting until a NMS polls the device as it waits to become operational. Updating at the time the device is placed into service is also desirable as opposed to sending a vendor-engineer to upgrade devices before they are placed into service, because of the obvious extra cost and because it is possible that the software load version could be upgraded again between the manual upgrade and the time the device is placed into service.

In addition, there is a need in the art form a method that facilitates using one configuration file for all devices, regardless of the vendor that manufactured a given device, and regardless of the model numbers of the devices. This would reduce the complexity of the system for obtaining the latest configuration file filename and then downloading it.

SUMMARY

A single configuration file may be used to deliver software load information to any of a plurality of devices, such as cable modems and embedded multimedia terminal adaptors, etc., that are manufactured by a plurality of vendors/manufacturers. Instead of sending one of a plurality of configuration files based on the vendor identification that is part of the MAC address, an equipment database table is included in the single configuration file.

Predetermined matching criteria, specific to a particular vendor and even to each of a plurality of device models from the same vendor are used to retrieve information corresponding to a particular device from the table. A MAC address vendor identifier of a given device is used to retrieve the appropriate set of data records from the equipment table that correspond to a device's vendor, to the exclusion of other records from the table that correspond to other vendors. Within the retrieved table of data records, predetermined matching criteria are used to determine a data record that corresponds to a given device. For example, a value corresponding to the hardware model number of the device may be used to compare to data values stored in a hardware model number field of all the records of the table to isolate a record corresponding to the device. Alternatively, other predetermined matching criteria may be used, such as, for example, the device's hardware revision number or the currently installed software revision number.

The record corresponding to the predetermined matching criteria contains the filename, or network address of the filename, of the latest software version for the particular device. The device can then initiate a download process from the service provider's TFTP server having the latest software revisions. Thus, a single configuration file contains data for many devices without the restriction of being able to support only one device per vendor identifier.

BRIEF DESCRIPTION OF THE DRAWINGS

FIG. 2 illustrates a flow diagram for a method for updating the software load of a network device using a single configuration file.

DETAILED DESCRIPTION

Figure 1:
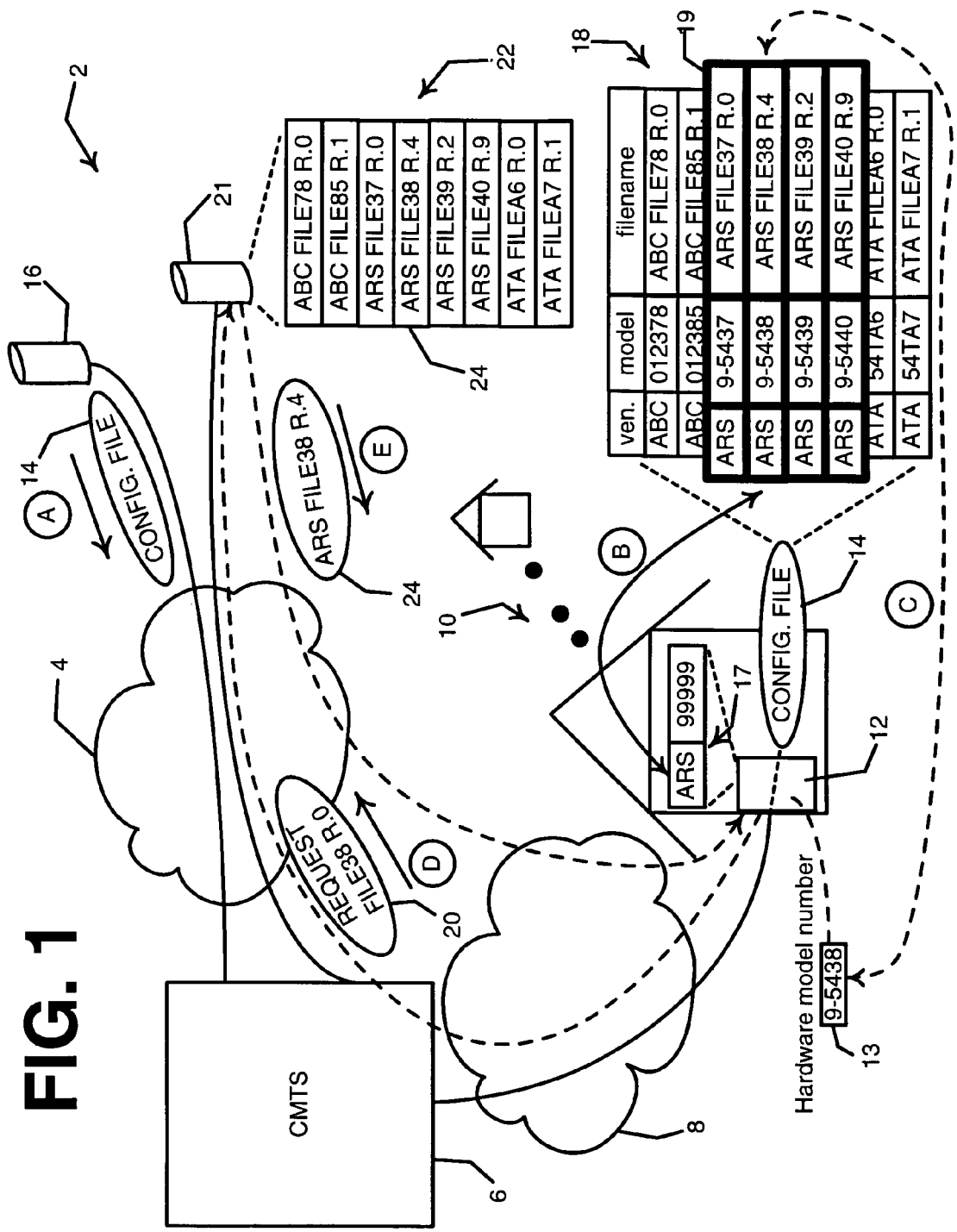
FIG. 1 illustrates a system for updating software in a multi-vendor, multi-product-per-vendor DOCSIS network environment.

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. This disclosure is not intended nor is to be construed to limit the present invention or otherwise to exclude other embodiments, adaptations, variations, modifications and equivalent arrangements, the present invention being limited only by the claims appended hereto and the equivalents thereof.

Turning now to the figures, FIG. 1 illustrates a system 2 for implementing the remote updating of a communication network device's software load. The network may comprise the Internet between a cable modem termination system ("CMTS") 6 and other network nodes, and a cable data network 8 between the CMTS and a plurality of end users 10 having a customer premise equipment device ("CPE") 12 such as, for example, a cable modem or embedded media terminal device. It will be appreciated that device 12 will typically contain embedded Management Information Base data objects ("MIB") 13 that can be extracted and used for various purposes.

When CPE 12 boots up, either for the first time after being placed into service, or thereafter, a configuration file 14 is sent from a first server 16, typically a TFTP server known in the art, having an IP address over internet 4 to CMTS 6, which forwards the configuration file over network 8 to modem 12. This occurs automatically as part of the DOCSIS protocol. It is noted that major steps in the method are labeled by encircled letters on the figure to indicate the sequence of these major steps. This first step of receiving the configuration file is labeled as encircled step A.

After configuration file 14 has been received at CPE 12 at encircled step A, at step B a vendor identifier that is part of the MAC address 17 of the CPE is used to isolate records from equipment table 18 that is included in the configuration file. The isolated records correspond to the vendor of CPE 12. These isolated records are collectively referred to as vendor table 19.

A management information base ("MIB") object is used to retrieve a record that corresponds to CPE 12 at step C. The record is retrieved from vendor table 19 based on a predetermined matching criteria, such as a devices hardware model/revision number or software revision number. This record is determined by performing a comparison using an MIB object embedded in CPE 12 corresponding to the predetermined matching criteria. The MIB variable is compared to a corresponding field of vendor table 19 containing values referring to a product's hardware and/or model number. The values in vendor table 19 fields are preferably type, length variables ("TLV") that relate to the hardware version or model number of a vendor's products.

The record determined at step C will typically include a value in another field that corresponds to a filename and revision number of the latest software revision for the particular CPE 12. At step D this filename value is then sent in a request message 20 to a second server 21, preferably a TFTP server. Second server 21 typically contains various files 22 that correspond to a plurality of vendors and a plurality of devices manufactured by each of the vendors. File 24, which is the file having the filename found in the record determined at step C is then downloaded at step E from second server 21 to CPE 12, which then installs the file. The device now has the latest software image load revision and the device resets. Upon resetting again, the device will recognize that it has the latest image load revision and will bypass the above steps, complete initialization and become operational.

Accordingly, in the example shown in the figure, device 12 manufactured by a vendor identified in MAC address 17 as ARS uses MIB values embedded therein to select the second record from the top of the records highlighted by the bold border lines, these records composing vendor table 19. This record matches the predetermined matching criteria value '9-5438' that is embedded in device 12. After this record is selected, the file name is determined to be ARS FILE38 R.4. This file name is then formed into a request message 20 and sent to server 21, from which the latest software revision image file ARS FILE38 R.4 is retrieved and sent back to device 12, where, upon receipt, it is installed into the device.

Turning now to FIG. 2, a more detailed flow diagram of the process generally described above is provided. The process 200 begins at step 202 and a service provider generates a configuration file at step 204 that includes information related to multiple vendors and multiple products manufactured by a give vendor. When a network device, such as a cable modem or an embedded media terminal adaptor performs its ranging and registering process at step 206, it downloads the configuration file at step 208.

After the configuration file has been downloaded at step 208, the device checks the configuration file for a TLV referring to a DOCSIS software load name at step 210. If found, then the image specified in this DOCSIS filename TLV is downloaded at step 214 from the TFTP server 21 as discussed above in reference to FIG. 1. After download, the device resets at step 216 and the process ends.

If at step 212 the DOCSIS filename TLV is not found, then a determination of whether a table of records corresponding to the device's vendor is made at step 218. To determine if TLV records corresponding to the device's manufacturer are present, the vendor ID from the device's MAC address is used to compare to vendor TLV record fields in the configuration file. Records having a value in a vendor TLV field that match the vendor ID from the MAC address comprise a list, or table, that are referred to as the vendor table.

If a vendor table cannot be found that comprises records corresponding to the device's vendor, then the device completes its initialization and is placed into service at step 220 using whatever software image is currently loaded.

If a vendor table comprising records corresponding to the device's vendor is determined at step 218, the table is parsed at step 222 for a record that corresponds to the device's hardware model number and/or revision number, for example. Records from the vendor table are compared to a predetermined matching criteria value. For example, the predetermined matching criteria could be the device's model number which is represented by a MIB object, MIB objects being known in the art, embedded in the device. If the MIB object value matches a value in a record field referring to a device's model number, then the record is examined for a field, or TLV, containing a file name. If a file name is found, the device downloads at step 224 the file referred to by the TLV from the second TFTP server 21 as discussed in reference to FIG. 1. After the file referred to in the matching record has been downloaded, the device resets with the new software image and becomes operational.

If a match at step 222 is not found, then the device completes initialization and goes into service with currently loaded software at step 220.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

We claim:

1. A method comprising:
    a customer premise equipment (CPE) downloading a CPE configuration file over a machine communication network;
    the CPE checking the configuration file for a software load name;
    if the software load name is found in the configuration file, the CPE downloading an operating software image specified in the software load name, and the CPE resetting and entering an initialized state ready for service;
    if the software load name is not found in the configuration file, the CPE determining if the configuration file includes a vendor table having records specific to a vendor of the CPE, the vendor table comprising Type Length Value data fields;
    if the vendor table is not found in the configuration file, the CPE entering the initialized state ready for service;
    if the vendor table is found in the configuration file, the CPE locating a record in the vendor table corresponding to a criteria unique to a subset of CPEs of the vendor of the CPE;
    if the record in the vendor table corresponding to a criteria unique to a subset of CPEs of the vendor of the CPE is found, the CPE downloading an operating software image specified in the record; and
    if the record in the vendor table corresponding to a criteria unique to a subset of CPEs of the vendor of the CPE is not found, the CPE entering the initialized state ready for service.

2. The method of claim 1, the vendor of the CPE identified from a media access control address of the CPE.

3. The method of claim 1, the criteria unique to a subset of CPEs of the vendor of the CPE comprising a hardware model number for the CPE.

4. The method of claim 1, the criteria unique to a subset of CPEs of the vendor of the CPE comprising a hardware revision number for the CPE.

5. The method of claim 1, the criteria unique to a subset of CPEs of the vendor of the CPE comprising a software revision number for the CPE.

6. The method of claim 1, the criteria unique to a subset of CPEs of the vendor of the CPE contained in a management information block (MIB) object for the CPE.

7. The method of claim 6, the MIB object for the CPE stored in a non-volatile memory of the CPE.

8. A device comprising:
a file retrieval module operable to download a configuration file over a machine communication network;
a boot module to place the device into an initialized and ready for service state;
a comparison module operable to check the configuration file for a software load name, and if the software load name is found in the configuration file, to operate the file retrieval module to download an operating software image specified in the software load name, and to operate the boot module to place the device into the initialized state ready for service;
a comparison module operable to
(i) check the configuration the for a software load name, and
(ii) if the software load name is not found in the configuration file, to determine if the configuration file includes a vendor table having records specific to a vendor of the device, the vendor table comprising Type Length Value data fields, and
(iii) if the vendor table is not found in the configuration file, to operate the boot module to place the device into the initialized state ready for service, and
(iv) if the vendor table is found in the configuration file, to locate a record in the vendor table corresponding to a criteria unique to a subset of devices of the vendor of the device, and
(v) if the record in the vendor table corresponding to a criteria unique to a subset of devices of the vendor of the device is found, to operate the file retrieval module to download an operating software image specified in the record, and
(vi) if the record in the vendor table corresponding to a criteria unique to a subset of devices of the vendor of the device is not found, to operate the boot module to place the device into the initialized state ready for service;
each of the comparison module, boot module, and file retrieval module stored in a non-transitory machine memory.

9. The device of claim 8, the vendor of the device identified from a media access control address of the device.

10. The device of claim 8, the criteria unique to a subset of devices of the vendor of the device comprising a hardware model number for the device.

11. The device of claim 8, the criteria unique to a subset of devices of the vendor of the device comprising a hardware revision number for the device.

12. The device of claim 8, the criteria unique to a subset of devices of the vendor of the device comprising a software revision number for the device.

13. The device of claim 8, the criteria unique to a subset of devices of the vendor of the device contained in a management information block (MIB) object for the device.

14. The device of claim 13, the MIB object for the device stored in a non-volatile memory of the device.

* * * * *